United States Patent [19]

Borzym

[11] Patent Number: 4,951,538
[45] Date of Patent: Aug. 28, 1990

[54] SINGLE CUT DIE SET

[76] Inventor: Alexander Borzym, 4769 Pebble Point St., West Bloomfield, Mich. 48322

[21] Appl. No.: 334,348
[22] Filed: Apr. 7, 1989
[51] Int. Cl.5 .................. B23D 21/00; B23D 25/04
[52] U.S. Cl. ........................ 83/388; 83/319;
 83/376; 83/460; 83/555; 269/138; 269/229
[58] Field of Search .............. 83/54, 319, 310, 376,
 83/377, 383, 385, 388, 390, 776, 563, 636, 647,
 554, 555, 574, 452, 460; 269/138, 218, 229, 236

[56] References Cited

U.S. PATENT DOCUMENTS

| 683,289 | 9/1901 | John | 83/554 |
|---|---|---|---|
| 2,672,675 | 3/1954 | Cross | 269/229 X |
| 2,747,445 | 5/1956 | McConnell et al. | 269/218 X |
| 2,776,003 | 1/1957 | Koster | 83/54 |
| 3,099,182 | 7/1963 | Alverson | 83/383 |
| 3,170,322 | 2/1965 | Cavanaugh | 269/218 X |
| 4,015,496 | 4/1977 | Hill | 83/466.1 |
| 4,108,029 | 8/1978 | Borzym | 83/310 X |
| 4,315,449 | 2/1982 | Borzym | 83/319 |
| 4,475,607 | 10/1984 | Haney | 269/218 X |
| 4,694,718 | 9/1987 | Kinsley | 83/385 X |

FOREIGN PATENT DOCUMENTS 0161043  8/1985  Japan ..................... 269/218

Primary Examiner—Douglas D. Watts
Assistant Examiner—Rinaldi Rada
Attorney, Agent, or Firm—Lyon & Delevie

[57] ABSTRACT

Single blade, single cut tubing cut-off apparatus moves a blade along a first path of travel in which a first portion of the blade pierces the tubing and a second path of travel in which a second portion of the blade completes the cut, all in a concerted process. Motion of the blade is controlled by a cam and follower. The tubing is clamped for cutting by a pair of pivotably mounted jaws opened and closed by spring biased cam action.

11 Claims, 3 Drawing Sheets

SINGLE CUT DIE SET

FIELD OF THE INVENTION

The present invention relates generally to a cut-off apparatus of the type employed to sever successive lengths of tubing or other generally hollow, elongated stock. More particularly, the cut-off apparatus includes a cut-off die set having die jaws and a single cut-off blade employed to clamp, pierce and sever the tubing in a single stroke without dimpling of the tubing.

BACKGROUND OF THE INVENTION

Devices for cutting off successive lengths of a continuously moving, elongated workpiece such as tubing emanating from a mill, are well known in the art. Typically, the tube cut-off device comprises a die set mounted on a carriage for selective motion along the length of the tubing. The die set and carriage are mounted on a flying type ram operated in synchronism with the movement of the tubing. In a typical prior art apparatus such as that disclosed in Patent No. 3,938,415, the disclosure of which is hereby incorporated by reference, a dual step cutting sequence is employed. A first stage in the cutting is accomplished by a prepiercing mechanism which includes a piercing blade which is reciprocated across the upper periphery of the tubing after the tubing is clamped within die set clamping jaws and just prior to the descent of the main cut-off blade. Prepiercing the tubing eliminates dimpling of the tubing, often resultant from prior art single stroke "guillotine-type" cut-off devices.

In the above-described double cut tube cut-off apparatus the tubing is first clamped by die jaws operated by means of the ram mechanism which drives a vertically extending cam between cam surfaces. This causes reciprocal motion of the die jaw mounts toward one another effecting the clamping of the tube therebetween as disclosed in the above identified patent. Since the tubing is clamped within the die set for only a short time interval and because the piercing blade must be removed from the path of the descending cut-off blade before severing can be effected, the movement of the piercing blade is very rapid. Control of the blades at high speed presents various problems. Also in some instances, the path of travel of the severing blade may not be precisely aligned with that of the piercing blade, either due to wear over an extended period of use or as a result of errors in original manufacturing tolerances. In the case of minor misalignment in the paths of travel of the piercing and severing blades, the severing blade may initially engage the exterior side wall of the tubing along the edge of the pierce rather than penetrating the pierce itself resulting in a dimpling of the tubing. Additionally, misalignment of the severing blade relative to the piercing blade increases wear of the severing blade and produces additional drag on the severing blade, since the blade may frictionally engage the blade supporting surfaces of the clamping members.

A further problem is created by the high velocity of the piercing blade inasmuch as this creates considerable heating of the piercing blade, leading to relatively rapid wear thereof.

U.S. Pat. No. 4,015,496 of Hill discloses a tube cut-off apparatus in which a single blade of the apparatus effects the notching and severing of the tubing in two distinct strokes. The apparatus includes means for moving the blade in a first direction to notch the tube and in a second direction to sever the notched tube at a point commencing with the previously formed notch.

Hill employs a cut-off blade having a generally horizontal notching tip portion and severing portions diverging therefrom. Hill teaches that the blade first travels horizontally across a chord of the tube to notch it, then for the second stroke, the blade returns to the initial precut position and is driven downward at an angle of 90° to the first direction of travel to complete the cutting of the tube. With this type of dual stroke operational sequence, problems with blade misalignment after the notch has been made as well as excessive blade wear due to the rapid velocities involved tend to create blade failures as well as high rates of blade wear, similar to the dual blade apparatus.

It can therefore be seen that there is yet a need for a single blade tubing cut-off apparatus which effects the piercing and severing of continuously moving tubing in a single stroke without dimpling of the tubing. The present invention addresses these problems by providing a single blade, single stroke tube cut-off apparatus wherein the blade of the apparatus is first driven by means of a cam follower against a cam surface in a vertical direction to pierce the tube and which subsequently moves at an angle to this first direction without return to its initial position to complete the severing of the tube in one stroke. In this manner, dimpling of the tubing during the severing thereof is eliminated. The present invention also provides novel means for clamping the workpiece in die jaws utilizing spring biased means to pivot the die jaws to the clamped position.

These and other advantages of the present invention will be apparent from the discussion, drawings, description and claims which follow.

SUMMARY OF THE INVENTION

There is disclosed herein a single blade, single stroke cut-off device for a tube cutting apparatus comprising a cut-off blade mounted transaxially with respect to the tube. The blade has a tip adapted to pierce the tube and at least one cutting edge for severing the tube. The device further comprises means for moving the blade along a concerted path of travel, the path having a first component wherein the tip of the blade moves in a first direction along at least a part of a first chord of a circular cross section of the tube to effect piercing thereof. The path of travel also has a second component wherein the blade tip moves in a second direction along at least part of a second chord of the circular cross section of the tube to effect the severing of the tube by the blade's cutting edge said second direction being disposed at an acute angle with respect to said first direction of blade tip movement.

The blade of the tube cutting apparatus comprises a first vertical cutting edge and a second cutting edge disposed at an acute angle thereto, these cutting edges meeting to form the blade tip. The blade may further comprise a third cutting edge disposed at an obtuse angle with respect to the second cutting edge similar to the obtuse angle formed between the first chord and the second chord of the circular cross section of the tube.

The means for moving the blade along the concerted path of travel comprises a blade holder in which the blade is mounted, an upper die shoe in which the holder and the blade are displaceably mounted for reciprocal, generally horizontal sliding motion in a first direction and a lower die shoe. The means for moving the blade further comprises means for vertically reciprocating the upper die shoe with respect to the lower die shoe in a second direction transverse the first direction, a camming surface similar in configuration to the concerted path of travel, a cam follower rotatably mounted to the blade holder and means for biasing the blade holder in a first position in the upper die shoe. Actuating the reciprocating means moves the upper die shoe towards the lower die shoe and causes the blade to move in the first and second directions in response to the movement of the cam follower along the cam surface, thereby describing the concerted path of travel and effecting the piercing and severing of the tube. The biasing means causes the blade to return to its first position after severing the tube and reciprocating the upper die shoe away from the lower die shoe.

The tube cutting machine further includes means for clamping the tube during piercing and severing thereof, comprising a pair of opposed die jaws and means mounting each jaw to the lower die shoe for pivotal movement of the jaws between an open release position and a closed clamping position. The mounting means has an interior die jaw facing side and an opposed exterior side including a camming surface extending along a portion thereof.

The clamping means further comprises means for urging each of the jaws to the closed clamping position, the means comprising a pair of cam levers, each having a first end and second end and which are pivotally attached to a support member. The urging means further comprises a pair of cam rollers, each cam roller rotatably secured to the first end of each cam lever, and which are configured to engage the camming surfaces of the exterior surface of each die jaw mounting means, and biasing means in mechanical communication with the second end of each cam lever for biasing each cam lever from a first position to a second position.

The clamping means further includes a pair of links secured to the upper die shoe and extending generally vertically between each of the cam rollers and the upper die shoe. Each link engages one of the cam rollers upon reciprocation of the upper die shoe away from the lower die shoe. Upon reciprocating the upper die shoe towards the lower die shoe, the biasing means pivots the cam levers from the first position to the second position, urging the cam rollers against the respective cam surfaces of each of the die jaw mounting means. This forces the die jaws to the closed, clamped position securely holding the tubing during piercing and severing. After severing the tube, and upon reciprocating the upper die shoe away from the lower die shoe, each of the links engages the respective cam roller, causing each of the cam levers to pivot back to the first position and allowing the die jaws to open and the tube to pass freely therethrough.

DETAILED DESCRIPTION OF THE INVENTION

Figure 1:
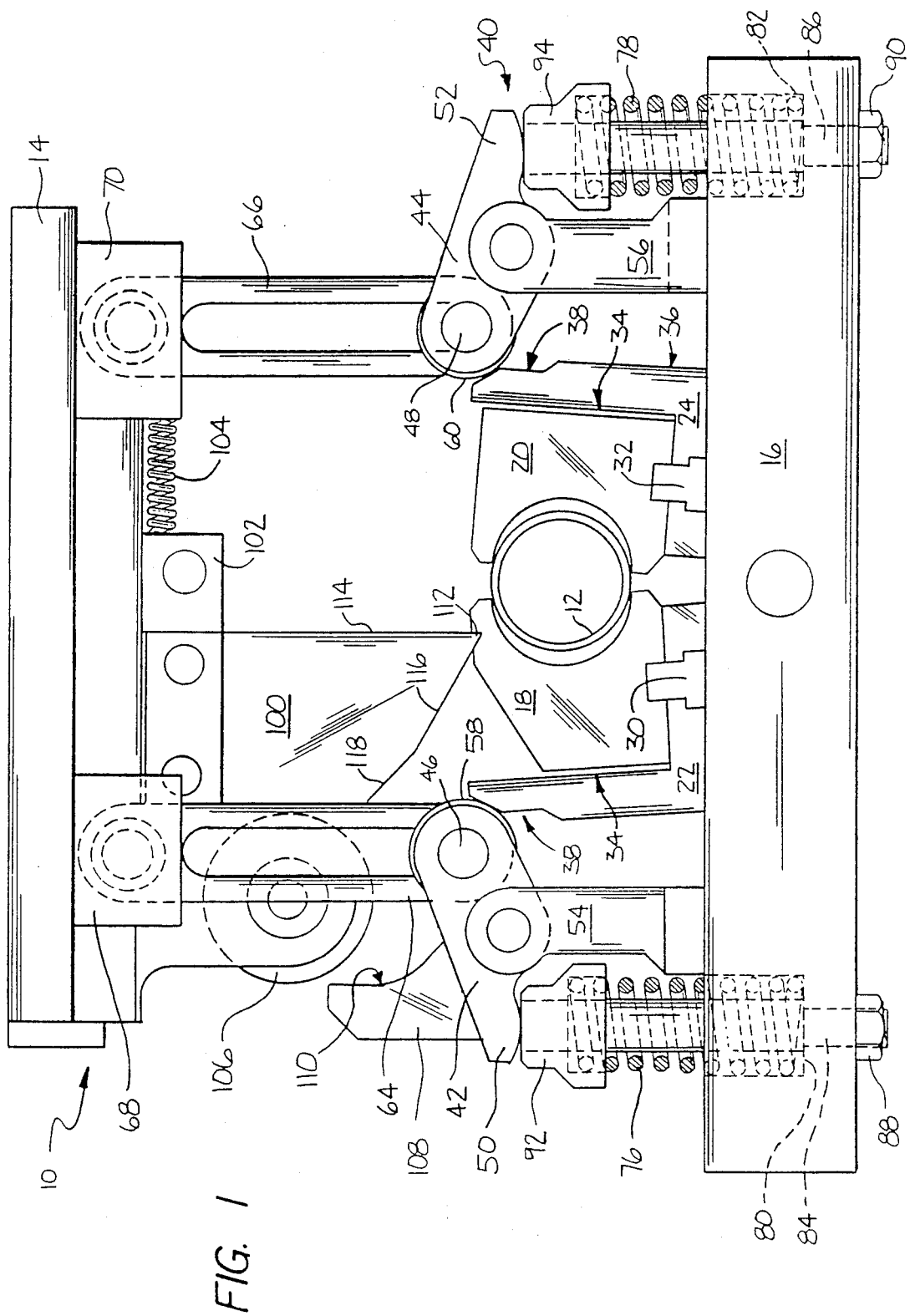
FIG. 1 is a front elevational view of a tube cut-off apparatus structured in accord with the principles of the present invention as disposed in an open or release position.
Figure 2:
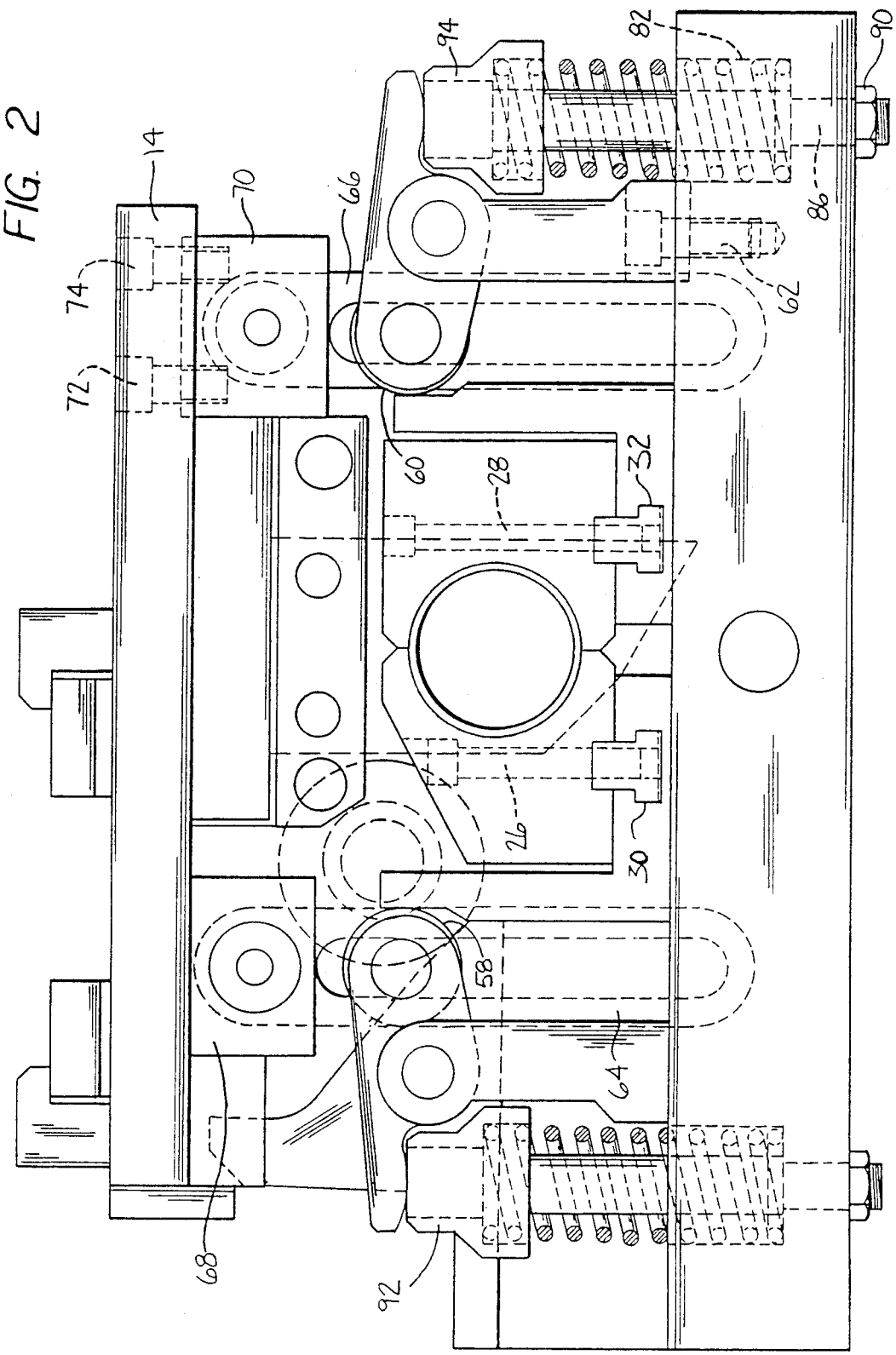
FIG. 2 is a front elevational view of the tube cut-off apparatus of FIG. 1 in the closed or clamped position after the cut-off blade has severed the tubing and before the apparatus has been reciprocated to the open position.

Referring now to the drawings, FIGS. 1 and 2 are front elevational views of one embodiment of apparatus for cutting off successive lengths of an elongated workpiece, such as tubing 12. The tube cutting apparatus comprises a die set, generally designated by numeral 10, which is adapted to be mounted in association with a die press or the like (not shown). Die set 10 is mounted as is well known to those skilled in the art as to be slidable along a rail set (not shown) within the press. The press normally includes a swinging or orbiting type ram mechanism driving the die set 10.

As is well known in the art, and as is disclosed in the aforesaid U.S. Pat. No. 3,938,415, die sets of this general type operate by the ram mechanism first causing a pair clamping jaws to clamp the die set to the rapidly moving workpiece, with the cut-off apparatus positioned to receive the elongated stock emanating from the processing fabrication mill. The die set, being clamped to the moving tube, moves together with the tube along a rail set provided in such apparatus. The ram mechanism then causes the main cut-off blade to be reciprocated to shear off a slug from the tube section clamped within the die set, severing a length from the moving tube. The ram mechanism, then operating in reverse manner, causes retraction of the cut-off blade and then unclamping of the die set from the tube section, as the cut-off die set approaches the end of its travel on the rail set, allowing the tubing to advance through the die set. A reciprocating mechanism returns the die set to its initial position on the rail set preparatory to initiation of a new cycle.

Inasmuch as such apparatus and these features of that apparatus are now very well known in the art, a complete description of the same is not deemed necessary for proper understanding of the improved die set according to the present invention. Reference may be had to U.S. Pat. No. 4,108,029, the disclosure of which is hereby incorporated by reference.

The die set 10 according to the present invention, includes an upper die shoe 14 adapted to be secured to the ram operating mechanism and a lower die shoe 16 received within the rail set of the cut-off apparatus. The upper die shoe 14 and lower die shoe 16 are mounted to allow reciprocatory motion toward and away from each other upon operation of the ram operating mechanism. To guide the upper die shoe 14 and the lower die shoe 16 in this movement, a plurality guide post bushings (not shown) and guide posts (not shown) are affixed, respectively, to the upper die shoe 14 and the lower die shoe 16, with the guide post being slidable on the guide post bushings.

Die set 10 further includes a pair of opposed die jaws 18, 20 for securely clamping the tubing 12 therebetween during piercing and severing thereof. Die jaws 18,20 may also be configured for clamping other types of stock emanating from a mill. Also, die jaws may be configured in two parts so as to define a slot through which the cut-off blades passes as disclosed in the above-identified patents. Die jaw mounting means, such as die jaw holders 22, 24, are secured to lower die shoe 16 in such a manner as to be pivotally mounted in relation to one another. As shown in FIG. 2, die jaws 18, 20 define interior channels 26,28, respectively, for receiving threaded rod fasteners therethrough which are matingly engaged with tee nuts 30,32. Tee nuts 30,32 or other like securing devices, secure die jaws 18, 20 to die jaw holders 22,24 respectively, so that die jaws 18,20 pivot toward and away from one another.

Each die jaw holder 22, 24 further includes an interior die jaw facing surface 34 and an exterior surface 36. Camming surface 38 is disposed along at least a portion of each die jaw exterior surface 36.

Upon reciprocation of the ram mechanism, upper die shoe 14 is caused to reciprocate generally vertically toward lower die shoe 16. Die jaws 18, 20 are urged to the closed or clamped position by a camming assembly 40 which comprises a pair of cam levers 42,44, each having a first end 46,48 and a second end 50,52, respectively. Cam levers 42, 44 are pivotally mounted to support members 54,56. Support members 54,56 are preferably fabricated from a rigid iron alloy, and are mounted to lower die shoe 16 by means of fasteners 62, such as a threaded rod fastener or the like. A pair of cam rollers 58,60 are rotatably secured to the first ends 46,48 respectively, of the cam levers 42,44. The cam rollers are configured to engage the camming surfaces 38 defined on die jaw holders 22, 24.

A pair of links 64,66 are secured to the upper die shoe 14 by means of casings 68,70. Casings 68,70 are securely attached to upper die shoe 14 by means of fasteners 72,74, preferably threaded rod fasteners, which project through upper die shoe 14 and into engagable relationship with casings 68,70. The links 64,66 extend generally vertically between upper die shoe 14 and each of the cam rollers 58,60. Each link engages one of said cam rollers upon reciprocation of the upper die shoe 14 away from the lower die shoe 16 a distance approximately equal to or slightly greater than the distance of the concerted path of travel of the cut-off blade which will be described in greater detail below. In this manner, cut-off blade 100 will be moved completely clear of the tubing 12 before links 64,66 engage cam rollers 58,60. Thus, die jaws 18,20 do not open prematurely, causing tubing 12 to contact and possibly damage cut-off blade 100 as will be more fully discussed below.

Means 40 for urging die jaws 18,20 to the closed clamping position further include biasing means such as a springs 76,78 which are in mechanical communication with second ends 50,52 of each of the cam levers 42,44 by means of caps 92,94. Obviously, other biasing means such as hydraulic or pneumatic cylinders may be similarly employed. Lower die shoe 16 defines two chambers 80,82 for receiving and securing the springs 76,78 therein. In the illustrated embodiment, the springs 76,78 are secured into chambers 80,82 by threaded rod fasteners 84,86 which project through the center of springs 76,78 and through lower die shoe 16. Female threaded nuts 88,90 engage fasteners 84,86 for securing springs 76,78 into chambers 80,82.

The springs 76,78 act to urge each of cam rollers 58,60 against the camming surfaces 38 of die jaw holders 22,24, pivoting die jaw holders 22,24 and die jaws 18,20 to the closed, clamped position when the upper die shoe 14 begins its vertical reciprocation toward lower die shoe 16 during the beginning of a reciprocation cycle. The pivoting action of cam levers 42,46 by springs 76,78 creates a mechanical advantage which effectively increases the load applied by cam rollers 58,60 against camming surfaces 38 of die jaw holders 22,24 by a ratio of approximately 4:1. For example, a spring exerting a 1000 lb. force against a cam lever results in approximately a 4000 lb. clamping force by the cam roller against the camming surface of the die jaw holder. By utilizing this type of arrangement, a positive force is continuously applied against the tubing between the die jaws 20 that slippage of the tubing during piercing and severing is kept to a minimum. Also, if a foreign object, such as a piece of pierced tubing, is caught between the workpiece and the die jaw, the spring-cam lever design allows the cam lever to bias the spring into a down position to avoid damage to the die jaws.

Die set 10 further comprises a single cut-off blade 100 mounted in a blade holder assembly 102, which in turn, is secured to the upper die shoe 14. Blade holder assembly 102 reciprocates in a generally horizontal direction, perpendicular to the vertical reciprocating direction of the upper die shoe 14. Biasing means, such as, spring 104, between the blade holder assembly 102 and the upper die shoe 14 biases the blade holder assembly 102 to the first position, as shown in FIG. 1, prior to commencement of a cutting cycle. Spring 104 ensures that cut-off blade 100 is correctly positioned prior to the descent of upper die shoe 14 to lower die shoe 16 thereby avoiding damage to blade 100.

Cut-off blade 100 is mounted to the blade holder 102 by a plurality of threaded screws passing through the blade 100 and threadably received in holder 102. The holder 102 is secured to the upper die shoe 14 by a pair of threaded screws, such as cap screws, which pass through and engage the undersurface of the upper die shoe 14.

A cam follower 106 is rotatably mounted to the blade holder assembly 102 by a threaded nut fastener and is confined for movement on an inside camming surface 110 of a curved cam 108. The cam follower 106 and the camming surface 110 of cam 108 define means for moving the blade 100 along a concerted path of travel which will be described more fully below.

Figure 4:
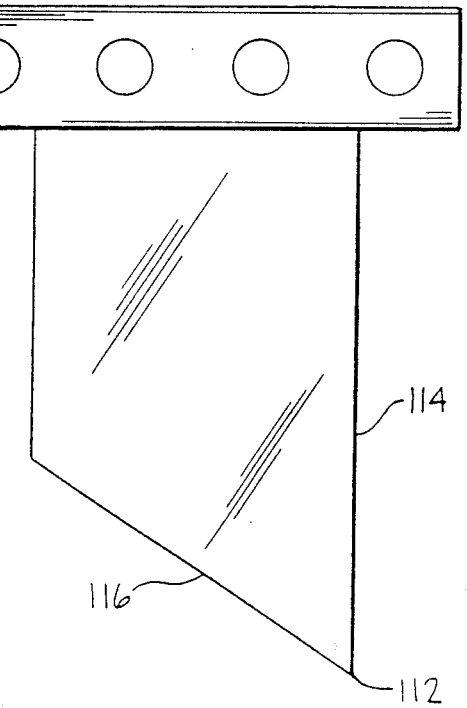
FIG. 4 depicts an alternative embodiment of a cut-off blade employed in the tube cut-off apparatus.

The cut-off blade 100 includes a tip 112 adapted to pierce the tube 12 on the downward reciprocation of the upward die shoe 14. The blade 100 further comprises a vertical first cutting edge 114 and a second cutting edge 116 disposed at an acute angle to the first cutting edge 114, these cutting edges meeting to form blade tip 112 as shown in FIG. 4. Alternatively, the blade may further include a third cutting edge 118 disposed at an obtuse angle with respect to the second cutting edge 116 as shown in FIG. 1.

Figure 3:
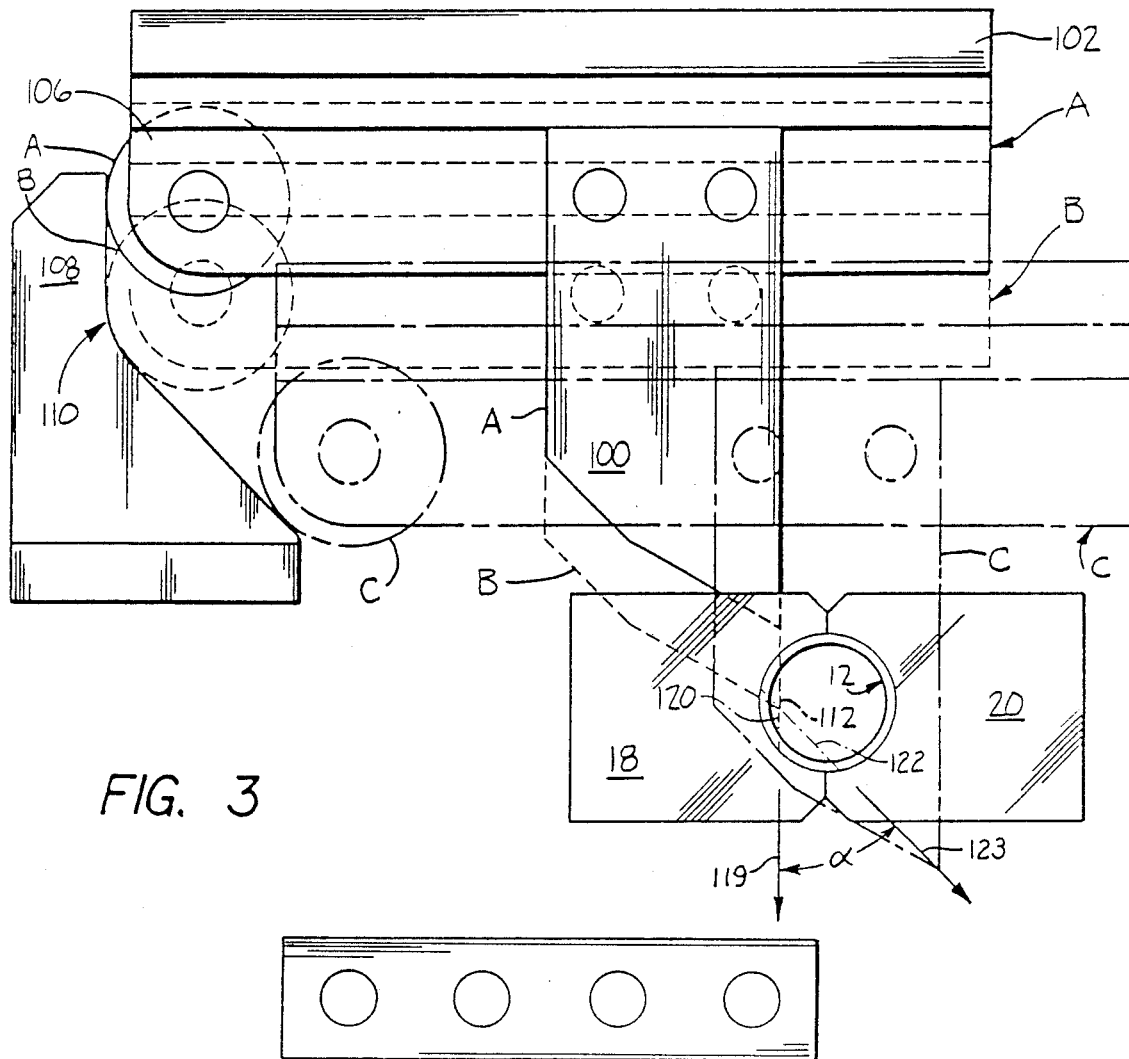
FIG. 3 is a front elevational view of the blade, blade holder and cam follower assembly of the cut-off apparatus of FIG. 1 showing the concerted path of travel of the blade during the piercing and severing operation of the tubing in three successive positions.

Referring now to FIG. 3, there is shown a view of the cut-off blade 100, the cam follower 106 mounted on blade holder 102 and cam 108 in three successive positions, A,B,C, illustrating the concerted path of travel of blade 100 during piercing and severing of tube 12 clamped between die jaws 18,20. At the beginning of a reciprocation cycle or sequence, the upper die shoe 14 is at its uppermost point, position A, as indicated by the solid, dark lines in FIG. 3. Cam roller 106 is at the very top of the camming surface 110, which surface 110 defines the concerted path of travel corresponding to the piercing and severing of tubing 12 by cut-off blade 100. The concerted path of travel has a first component indicated by movement of the cut-off blade 100 and blade holder 102 from position A to position B, the later position being indicated by the dashed lines in FIG. 3. Specifically, in this first component, the tip 112 of blade 100 moves in a first direction 119 along at least a part of a first chord 120 of the circular cross section of the tubing 12 to pierce tubing 12. Blade tip 112 completely penetrates a side wall of tubing 12 and this piercing relieves stresses in tube 12 present during the subsequent cutting of the tube 12 to provide a "start" point so as to effectuate a dimple free cut.

The concerted path of travel includes a second component as indicated by movement of the cut-off blade 100 and blade holder 102 from position B to position C, the latter position being indicated by the phantom lines in FIG. 3. Specifically, in this second component, the tip 112 blade 100 moves in a second direction 123 disposed at an acute angle α with respect to the first direction 119 of blade tip movement along at least a part of a second chord 122 of the tubing 12. This latter movement effects the severing of tube 12 by the cooperative action of the first 114, second 116 and third 118 cutting edges of blade 100. At the bottom of the reciprocation sequence, i.e., when the upper die shoe 14 has reciprocated its maximum distance toward the lower die shoe 16, the die set 10 is at the position shown in FIG. 2, whereby the entire cross section of the tubing 12 has now been severed.

OPERATIONAL SEQUENCE

The operation of the apparatus of the present invention will be described with reference to the figures. The first step in the machine cycle for cutting off a given length of the workpiece or tubing 12 consists of vertically shifting the ram assembly downward from its normally raised position. As the ram assembly travels downward, the upper die shoe 14 travels correspondingly downward. As the upper die shoe 14 moves towards lower die shoe 16 a small distance, but before the cut-off blade tip 112 begins to pierce tubing 12, the tensile forces of links 64,66 imposed upon cam rollers 58,60 are relaxed, thus causing springs 76,78 to pivot cam levers 42,44 and corresponding cam rollers 58,60 against the camming surfaces 38 of die jaw holders 22,24. This, in turn, causes die jaws 18, 20 to securely clamp tubing 12 as tubing 12 is passing through the die set 10. As the upper die shoe 14 continues its downward travel, cam follower 106, rotating against the camming surface 110 of cam 108 translates this downward motion of the upper die shoe 14 into the two component concerted path of travel of the cut-off blade 100. As the upper die shoe 14 continues toward the lower die shoe 16, the blade tip 112 engages the tube 12 as shown by position B of FIG. 3 causing the piercing thereof. Continued downward movement of the upper die shoe 14 causes the cam follower 106 to rotate against the camming surface 110, causing the severing of tubing 12 by cutting edges 114, 116, 118 of blade 100 in a single stroke of the die set as indicated by position C of FIG. 3.

As the ram assembly and the upper die shoe 14 begin their upper return stroke, the severing blade 100 is raised above die jaws 18,20. Links 64,66 engage the cam rollers 58,60 of cam levers 42,44. The upward movement of the ram assembly causes links 64,66 to exert an upward force on the cam rollers 58,60, pivoting the cam levers 42,44 to a second or down position, and compressing springs 76,78 into a down position, subsequently allowing the die jaws 18, 20 to pivot into the open position. The tubing 12 then freely begins to pass through the open die jaws until the ram assembly begins its next sequence and corresponding downward travel of the upper die shoe 14.

The cut-off apparatus may be employed in a "flying" mode wherein it cuts a continuously moving tube and in such instance, the sliding rail and ram arrangement described previously may be employed. Alternatively, the present apparatus may be employed as a fixed cut-off tool, used in a stationary mode to cut non-moving or intermittently moving tubing.

In the event that a foreign object, such as a piece of scrap tubing, becomes lodged either between the die jaws 18,20 or between the tubing and one of the die jaws, complete closing of the die jaws is prevented. In this case, the force of the die jaws 18,20 against die jaw holders 22,24 and the subsequent force against cam rollers 46,48 exceeds the biasing force of springs 76,78, thus preventing an overload of force against the components of the die set and thus preventing resultant damage thereto.

In light of the foregoing, it should be apparent that many variations are possible within the scope of the present invention. For example, hydraulic or air cylinders may be used in place of a spring for biasing the cam rollers of the cam levers against the die jaw holders. The links may be flexible or rigid members. The die jaws may be configured to clamp elongated stock other than tubing. The apparatus may be utilized for cutting bar stock, dual or double-walled tubing or a variety of stock having other crosssectional configurations. Also, the means for clamping the workpiece and the means for pivoting the die jaws are novel and are not limited for use solely on the single blade, single stroke cut-off apparatus described above, but may be used with double cut and other conventional die sets. Accordingly, the foregoing drawings, discussion and description are merely meant to be illustrative of particular embodiments of the invention, but not limitations upon the practice thereof. It is the following claims, including all equivalents which define the scope of the invention.

I claim:

1. A single blade, single stroke cutoff device for a tube cutting machine, said device comprising:
   a cutoff blade mounted transaxially with respect to the tube and having a tip adapted to pierce the tube and at least one cutting edge adapted to sever the tube; and
   means for moving the blade along a concerted path of travel, said path having:
      a first component wherein the tip moves in a first direction along at least part of a first chord of a circular cross section of the tube to effect piercing thereof; and
      a second component wherein the tip moves in a second direction along at least part of a second chord of said circular cross section of the tube to effect severing of the tube by said at least one cutting edge, said second direction of tip movement being disposed at an acute angle with respect to said first direction of tip movement.

2. The device of claim 1 wherein the blade comprises a vertical first cutting edge, and a second cutting edge disposed at an acute angle thereto, said cutting edges meeting to form the blade tip.

3. The device of claim 1 wherein the means for moving the blade along said concerted path comprises:
   a blade holder in which said blade is mounted;

an upper die shoe in which said holder and blade are displaceably mounted for reciprocal, sliding motion along a first line;

a lower die shoe, the upper die shoe being reciprocable with respect to the lower die shoe along a second line transverse said first line of blade reciprocation in the upper die shoe;

a camming surface similar in configuration to the concerted path of travel;

a cam follower rotatably mounted to the blade holder; and means for biasing the blade holder in a first position in the upper die shoe, wherein reciprocation of the upper die shoe along said second line toward the lower die shoe causes the blade to move in response to movement of the cam follower along the cam surface, thereby describing the concerted path of travel, said biasing means causing the blade to return to its first position upon reciprocation of the upper die shoe along said second line away from the lower die shoe.

4. The device of claim 3 wherein the biasing means comprises a spring.

5. The device of claim 1, further including means for clamping the tube during piercing and severing thereof, said means comprising:

a pair of opposed die jaws for clamping the tube therebetween;

means for mounting each jaw to said lower die shoe for pivotal movement of said jaws between an open release position and a closed clamping position, said means having an interior die facing surface and an opposed exterior surface, said exterior surface including a camming surface extending along at least a portion thereof; and means for urging each of said jaws to the closed clamping position.

6. The device of claim 5, wherein said urging means further includes:

a pair of cam levers, each having a first end and a second end and pivotally attached to a support member;

a pair of cam rollers, each cam roller rotatably secured to said first end of said cam levers and configured to be engagable with the respective camming surface of one of said die jaw mounting means;

biasing means in mechanical communication with the second end of each of said cam levers for biasing each of said cam levers from a first position to a second position; and a pair of links secured to said upper die shoe and extending generally vertically between each of said cam rollers and said upper die shoe, each link engagable with one of said cam rollers upon reciprocation of said upper die shoe away from said lower die shoe, whereby reciprocating the upper die shoe towards the lower die shoe causes the biasing means to pivot said cam levers from the first position to the second position urging said cam rollers against said respective cam surfaces of each of said die jaw mounting means and forcing said die jaws to the closed clamping position to securely hold said tube during piercing and severing thereof; and after severing of said tube and upon reciprocating said upper die shoe away from said lower die shoe, each of said links engages said respective cam roller causing each of said cam levers to pivot back to the first position, allowing said die jaws to open and said tube to pass freely therethrough.

7. The device of claim 1 wherein said means for moving the blade along said concerted path comprises:

a blade holder in which the blade is mounted;

a first die shoe;

a second die shoe in which said holder and blade are displaceably mounted for reciprocal, sliding motion along a first line, the second die shoe being reciprocable relative to the first die shoe along a second line transverse the first line;

a camming surface similar in configuration to the concerted path of travel;

a cam follower rotatably mounted to the blade holder; and means for biasing the cam follower against the camming surface, whereby the blade holder travels along said concerted path upon reciprocation of said second die shoe relative to said first die shoe.

8. A clamping device for clamping an elongated workpiece, said device comprising:

a pair of opposed die jaws for clamping the workpiece therebetween;

means for mounting each jaw to a base for pivotal movement of said jaws between an open release position and a closed clamping position, said means having an interior workpiece facing surface and an opposed exterior surface, said exterior surface including a camming surface extending along at least a portion thereof; and means for urging each of said jaws to the closed clamping position including a pair of cam levers, each having a first end and a second end and pivotally attached to a support member;

a pair of cam rollers, each cam roller secured to said first end of said cam levers and configured to be engagable with the respective camming surfaces of each of said die jaw mounting means;

biasing means in mechanical communication with the second end of each of said cam levers for exerting a biasing force upon said cam lever in a given direction for urging said lever from a first position to a second position; and a pair of links, each link engagable with one of said cam rollers and movable in a first and second direction generally parallel to said biasing force, whereby movement of the links in the first direction causes the biasing means to pivot said cam levers from the first position to the second position urging said cam rollers against said respective cam surfaces of each of said die jaw mounting means and forcing said die jaws to the closed clamping position to securely hold said workpiece during severing thereof, and movement of said links in the second direction causes said links to engage their respective cam rollers causing each of said cam levers to pivot back to the first position, allowing said die jaws to open and said workpiece to pass freely therethrough.

9. The device of claim 8, wherein the biasing means comprises a spring.

10. An apparatus for cutting off links of an elongated workpiece of the type including a reciprocating upper die shoe, an opposed lower die shoe, a cutting mechanism to effect the cutting of said workpiece, and means for clamping the workpiece during the cutting thereof, wherein the improvement comprises:

a pair of opposed die jaws for clamping the workpiece therebetween;

means for mounting each jaw to said lower die shoe for pivotal movement of said jaws between an open release position and a closed clamping position, said means having an interior die facing surface and an opposed exterior surface, said exterior surface including a camming surface extending along at least a portion thereof;

means for urging each of said jaws to a closed clamping position, said means including:

a pair of cam levers, each having a first end and a second end and pivotally attached to a support member;

a pair of cam rollers, each cam roller rotatably secured to said first end of said cam levers and configured to be engagable with the camming surface of one of said die jaw mounting means;

biasing means in mechanical communication with the second end of each of said cam levers for biasing said cam lever from a first position to a second position;

a pair of links secured to said upper die shoe and extending generally vertically between each of said cam rollers and said upper die shoe, each link engagable with one of said cam rollers upon reciprocation of said upper die shoe away from said lower die shoe.

11. The device of claim 10, wherein the biasing means comprises a spring.

* * * * *